Patented June 12, 1945

2,377,885

UNITED STATES PATENT OFFICE 2,377,885

PROCESS OF MANUFACTURE OF SYNTHETIC WOOL FROM SOYBEAN PROTEIN

Oskar Huppert, Chicago, Ill., assignor to The Glidden Company, Cleveland, Ohio, a corporation of Ohio No Drawing. Application December 20, 1939, Serial No. 310,190

2 Claims. (Cl. 18—54)

In United States Patent No. 2,112,210 is described a process in which protein hydrolysate products are changed into new products through means of cooking with carbon disulphide and subsequent oxidation by air in presence of a catalyst. The products in a mineral acid solution will not be destroyed even on boiling. These products have the character of disulphides. Chemical Abstracts 1936, p. 6394.

It has been found that even without preceding hydrolysis, such disulphides can be obtained from protein, such as: soybean protein. This is done through treatment with carbon disulphide followed by oxidation with air—even at low temperatures (20–45° C.). These disulphides so obtained cannot be destroyed by mineral acids. It is presumed, of course, that the hydroxyl ion concentration of the protein or protein hydrolysate before treatment with carbon disulphide corresponds at most to an aqueous solution of calcium hydroxide with a pH 10–11. The addition of sulphur as a catalyst can be omitted as it is obtained during the oxidation by air of hydrogen sulphide found in the chemical reaction.

Through the resistance of these protein disulphides to mineral acid it is now possible to change protein into a substance very similar to wool, or to form a spinning solution so as to manufacture synthetic wool.

The wool fibre is known to consist of micelles. The micelles are themselves composed of long peptide chains. Such long-folded chains run parallel to the length of the micelle and of the fibre. From the point of view of the insolubility of wool, the cystine disulphide linkage is no doubt most important. The preparation of synthetic wool from protein presupposes the obtainment of a spinning solution with a high structure viscosity. High viscosity solutions can only be expected from macro-molecules, which possess the form of a thread.

Casein particles are elongated and in their shape are analogous to thread molecules.

Soya protein particles are approximately spherical. In spite of the larger size of the molecule, the solutions in alkali have a low viscosity and are not plastic. The molecules of soya protein are tri dimensional, they form spatial constructed peptid chains which preform dioxopiperazine ("Huppert" The Protein, Chem. Abst. 113, 5356).

The difficulty of obtaining a spinning solution out of soya protein is, therefore, much greater than with casein.

Now a process has been developed to convert the spherical soya particles into elongated particles and so respectively dissolve the partial valences and thereby obtain a high viscosity spinning solution.

This desired goal can be obtained, as has been found, when the soya protein has been subjected to a specific treatment with pepsin in a hydrochloric acid solution, where the degree of the dispersion will be increased, but no further decomposition beyond the acid albumen stage takes place. One obtains now long, folded peptid chains which run parallel with the length of the micelle.

One may proceed by treating first with pepsin, and then following this treatment by a treatment with substances prepared according to United States Patent No. 2,112,210. One can also carry out the reaction by taking the protein obtained by treatment with pepsin (hydrolyzed protein) and subjecting it to the treatment recorded in United States Patent No. 2,112,210. One obtains by these methods highly viscous and plastic solutions which can be spun into fibre by known methods.

By textile soya protein is meant a soya protein treated with pepsin, either alone or in the presence of thioproteins prepared according to United States Patent No. 2,112,210.

The sulfurized soya proteins or textile soya proteins which may be used in this invention must be prepared without any excess of free alkali or with a hydroxyl ion concentration (pH 10–11) which corresponds to that of a solution of calcium hydroxide in water, whereby after the sulfidation at a pH of 6–7 a separation of $H_2S$ takes place and a condensation of dithiocarbamates into thiohydantoin. Through oxidation by air of this condensate the formation of a disulfide corresponding to the merkaptohydantoin protein has been made possible.

The chemical reactions can be formulated schematically, if $R-NH-CO-CHR-NH_2$ represents protein, as follows:

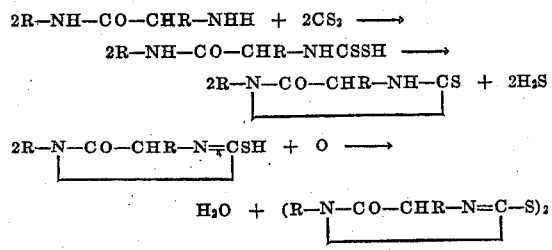

Example 1

720 grams soya protein are mixed with 5 liters water containing 90 cc. hydrochloric acid, one to two grams of pepsin according to its activity is then added which must be well stirred into the solution. This suspension is then held at 25° C. for 6 to 12 hours, sodium hydroxide added to a pH of 3.6 thereafter filtered or centrifuged and the the resulting textile soya protein dried.

Example 2

720 grams soya protein are mixed with 5 liters water containing 90 cc. hydrochloric acid, one gram of pepsin and 14 grams of thio-gelatine, which has been prepared according to United States Patent No. 2,112,210. is then well stirred into the suspension. This suspension is then held at 25° C. for 6 hours, filtered or centrifuged and washed. By this means textile soya protein which may be used for the further preparation of spinning solution is obtained.

Example 3

800 grams of textile soya protein such as may be prepared according to Examples 1 and 2 are dissolved in 4.2 liters water containing 40 grams sodium hydroxide. The soya protein spinning solution so obtained is allowed to age one to two days and is freed from air before spinning. It is spun in a precipitation bath of a combination of 8% sulphuric acid and 4% of 40% formaldehyde (38%) at 30° C. The composition of the precipitation bath may be changed or altered in many ways in that one may add salts or organic compounds, etc. The thread is then further treated in 5% formaldehyde, well washed, dyed, and further treated in a bath containing high molecular soaps or impregnated with a solution of wetting agent. The threads may also be bleached after the soaping process. Finally the threads are wound together, stretched and run through a cutting machine, where they are cut into the required length. The wool is then dried, curled and made ready for sale.

Example 4

800 grams of textile soya protein is added to 4.2 liters of water containing 20 grams sodium hydroxide and 20 grams of yellow thiogelatine which has been prepared according to United States Patent No. 2,112,210, and the mixture stirred. The hydrolyzed protein solution so prepared is aged two days and the air then exhausted before spinning. The spinning takes place in a precipitation bath containing 4% sulphuric acid and 4% formaldehyde. Further processing is the same as that given in Example 3. In place of thiogelatine any other thio-protein prepared according to United States Patent No. 2,112,210 may be used.

Example 5

800 grams of textile soya protein (hydrolyzed protein) are added to 4 liters of water. While agitating 180 grams of caustic solution 21.5% by volume, until the pH of the solution reaches 10–11. The solution is warmed to 45° C. and at this temperature 40 cc. to 60 cc. carbon disulphide is added with vigorous stirring. It is stirred for one-half hour whereby the pH is lowered to 6–7. Air is now bubbled into the solution which is held at 60° C. with vigorous stirring for one hour. The spinning solution so made is allowed to age one to two days before spinning. Air is removed before spinning. The spinning takes place in a precipitation bath containing 8% sulphuric acid and 4% formaldehyde. Further processing is the same as that given in Example 3.

It will be understood that the detailed procedures described are capable of wide variation and modification without departing from the spirit of this invention.

Having now particularly described and ascertained the nature of my said invention and in what manner same is to be performed, I declare that what I claim is:

1. In a process for producing artificial fibers which involves spinning an alkaline solution of soya protein into an acid coagulating bath, the improvement in the preparation of the spinning solution consisting of hydrolyzing soya protein with pepsin in a hydrochloric acid solution whereby the degree of dispersion of the protein in the hydrochloric acid is increased, but no decomposition beyond the acid albumen stage takes place, forming an alkaline solution of the thus hydrolyzed soya protein, and aging the alkaline solution before spinning.

2. In a process of producing artificial fibers in which an aged alkaline solution of soya protein is spun into an acid coagulating bath, the improvement in the preparation of the alkaline spinning solution consisting of hydrolyzing soya protein with pepsin in a hydrochloric acid solution whereby the degree of dispersion of the protein in the hydrochloric acid is increased but no decomposition beyond the acid albumen stage takes place, and forming an alkaline solution of the thus hydrolyzed protein.

OSKAR HUPPERT.